United States Patent [19]
Harrigan

[11] Patent Number: 4,812,021
[45] Date of Patent: Mar. 14, 1989

[54] WIDE ANGLE ZOOM LENS

[75] Inventor: Michael E. Harrigan, Webster, N.Y.

[73] Assignee: Xerox Corporation, Stamford, Conn.

[21] Appl. No.: 105,779

[22] Filed: Oct. 7, 1987

[51] Int. Cl.$^4$ .......................... G02B 15/00; G02B 9/62
[52] U.S. Cl. .................................................... 350/425
[58] Field of Search ........................................ 350/425

[56] References Cited

U.S. PATENT DOCUMENTS

| | | |
|---|---|---|
| 3,728,010 | 4/1973 | Mikami . |
| 3,865,470 | 2/1975 | McCrabie et al. . |
| 3,912,374 | 10/1975 | Liu . |
| 4,061,419 | 12/1977 | Price et al. . |
| 4,406,522 | 9/1983 | Conrad .............................. 350/425 |
| 4,650,295 | 3/1987 | Terasawa ............................ 350/425 |

FOREIGN PATENT DOCUMENTS 2831986  2/1980  Fed. Rep. of Germany ...... 350/425

*Primary Examiner*—John K. Corbin
*Assistant Examiner*—Rebecca D. Gass

[57] ABSTRACT

A wide angle, finite conjugate lens is optimized for use in photocopying applications. Two moveable groups of lenses are movable towards and away from each other and a central aperture. An outer lens group pair is moveable with respect to a moveable inner lens group. The lens groups are moved during a zoom magnification change so that the spaces between the inner and outer lens groups are changed to adjust lens focal length while the space between the inner lens group and a central aperture stop is adjusted to compensate for astigmatism and field curvature variation.

3 Claims, 7 Drawing Sheets

WIDE ANGLE ZOOM LENS

BACKGROUND OF THE INVENTION AND PRIOR ART STATEMENT

The invention relates to a zoom, or variable magnification lens and, more particularly, to a finite conjugate 10-element symmetrical zoom lens covering a half-field angle over 39° and particularly suited for operation in a photocopying environment.

Photographic zoom lenses are well known in the art, the great majority operating over a half-field angle of less than 25°. These lenses are characterized by being asymmetric and having conjugates to infinity. By contrast, zoom lenses used in photocopying devices tend to group the lens element comprising the lens symmetrically about a center stop position to reduce the effects of coma, lateral color or distortion. These lenses also operate with a finite conjugate. In prior art devices zoom lenses typically comprise multiple elements arranged symmetrically about a central aperture with one pair of symmetrically oriented lenses being movable.

The zoom lens must be designed to maintain total conjugate and focus as it goes through the zoom magnification range. A finite conjugate lens, as used in photocopier applications, thus normally requires an overall lens motion and some motion of lens elements relative to each other. U.S. Pat. Nos. 4,061,419, 3,728,010 and 4,406,522 are representative of lenses which undergo two motions, a lens grouping adjustment and the lens motion.

A remaining problem in prior art lenses is the requirement to compensate for various aberrations. Spherical aberration, axial color, astigmatism and field curvature add, rather than cancel between the front and back halves of a symmetric lens. Some parts of astigmatism can cancel between the two halves, but some cannot. Therefore, this second group of aberrations needs to be more highly corrected in each half. As a symmetric lens zooms to a magnification different from 1×, it is no longer working at symmetric conjugates. This causes an imbalance in coma, lateral color, and distortion between each half of the lens which results in non-zero values of these aberrations. These problems are particularly acute in finite conjugate lenses operating over wide field angles.

The zoom lens of the present invention is designed to compensate for these aberrations, and particularly to compensate for the astigmatism variation as the lens zooms. This compensation is achieved by introducing an additional lens movement within the lens to vary the central aperture air spacing. While prior art devices are known which introduce a second lens element movement within the lens (e.g. U.S. Pat. Nos. 3,912,374, and 3,865,470); none accomplish the prescribed motion of the lens halves of the present lens design in order to correct the astigmatism and field curvature over a large field angle.

IN THE DRAWINGS

Figure 1:
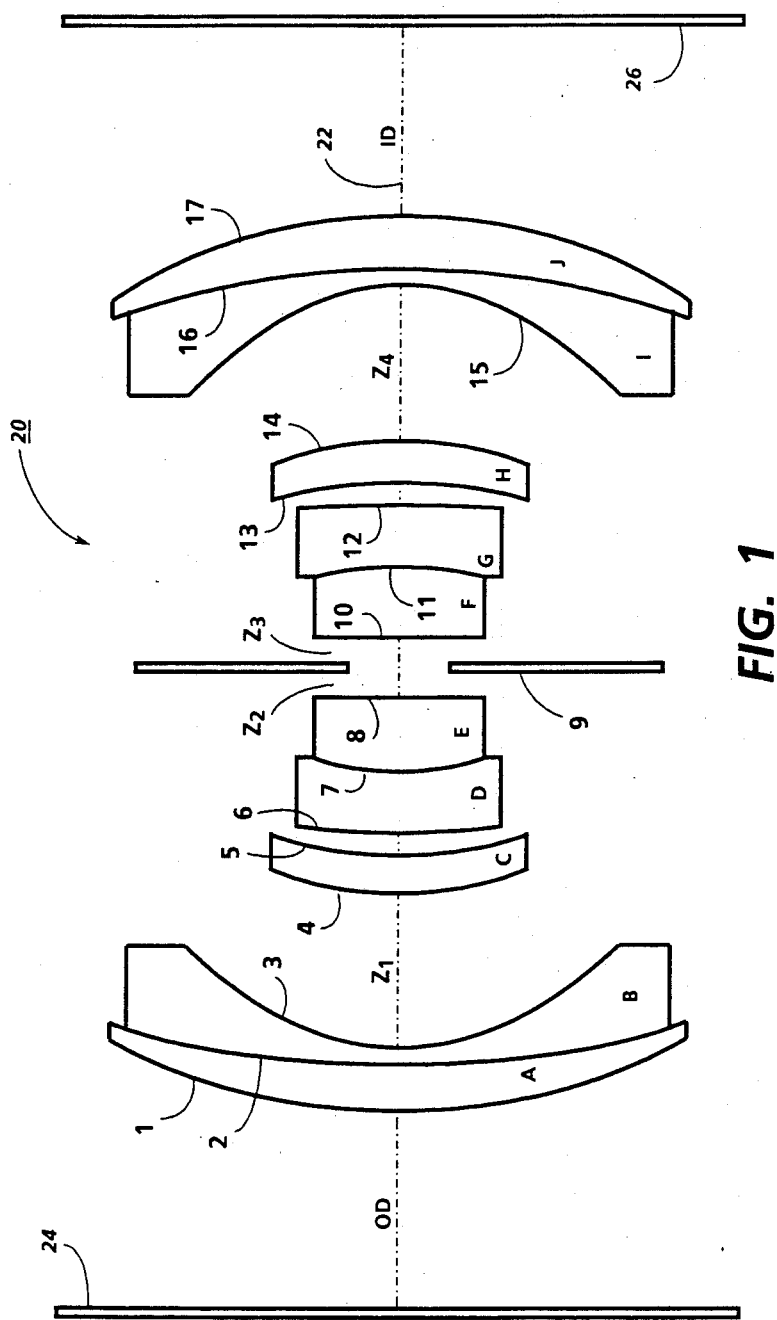
FIG. 1 is an optical side view of the wide angle lens of the present invention.
Figure 5:
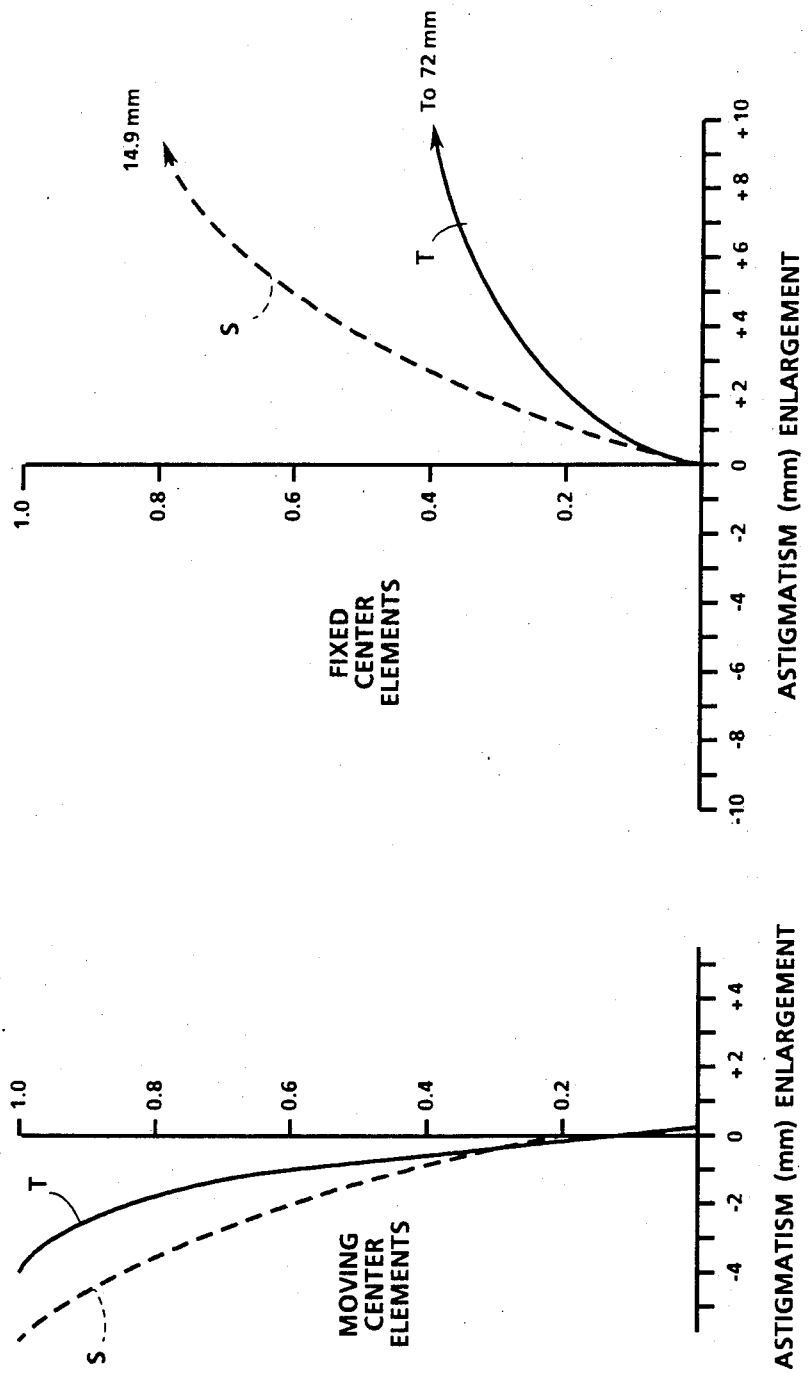

FIG. 5 compares the effect of astigmatism on the lens of FIG. 1 both with and without central aperture space adjustment.

Figure 6:
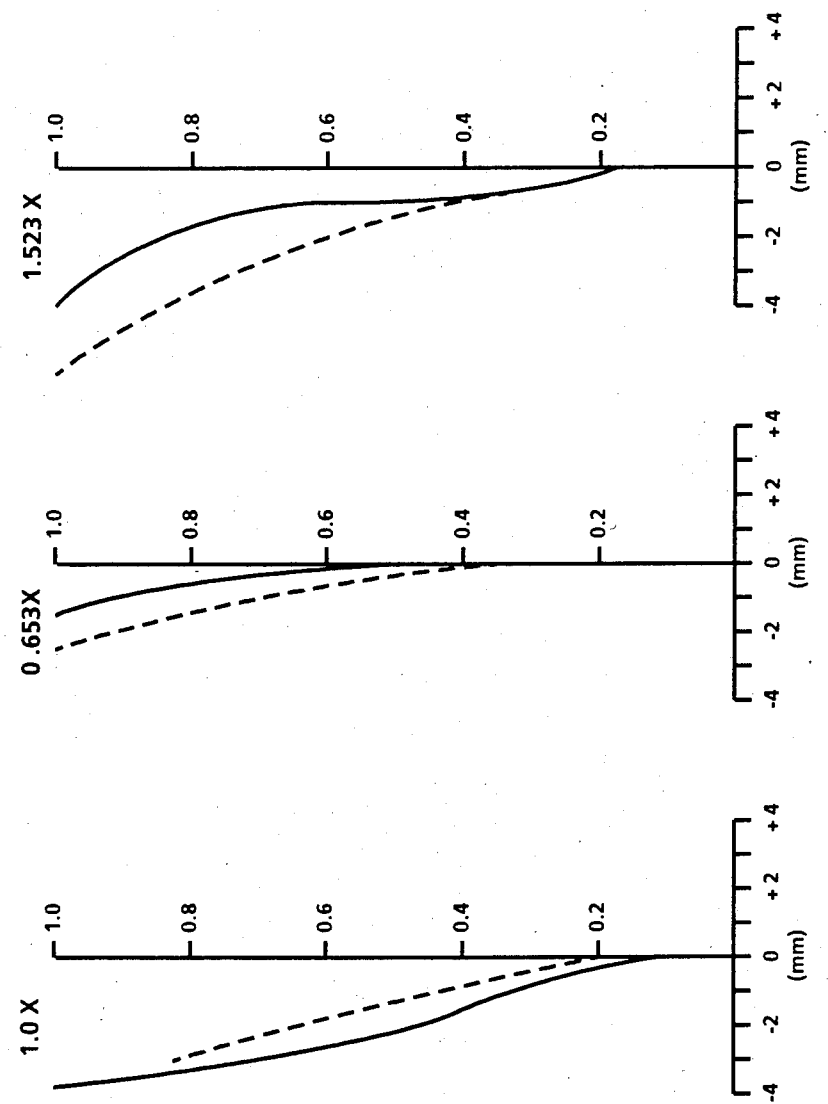

FIG. 6 shows astigmatism curves at three separate magnifications.

Figure 7:
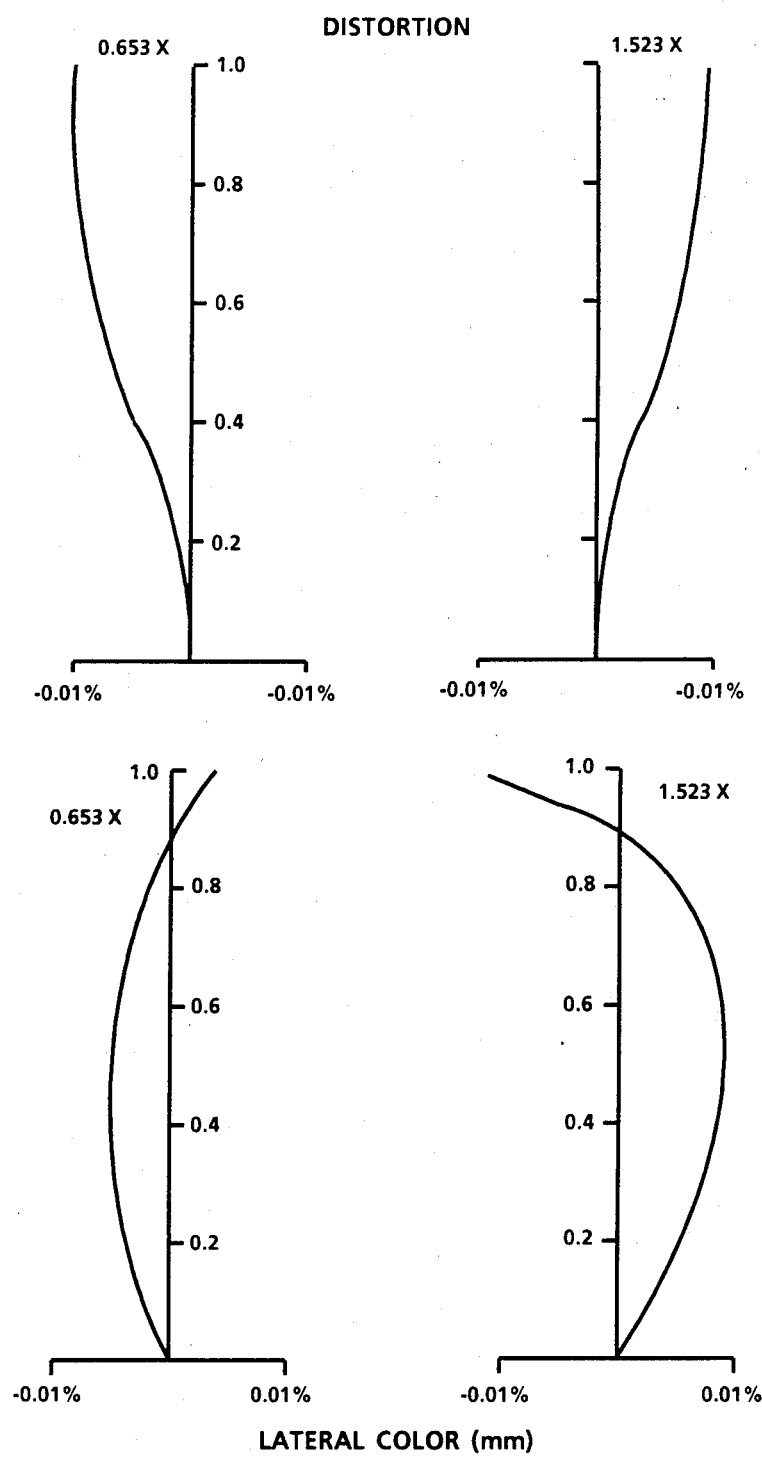

FIG. 7 shows lateral color and distortion aberration curves plotted against relative field for the extreme magnifications.

Figure 8:
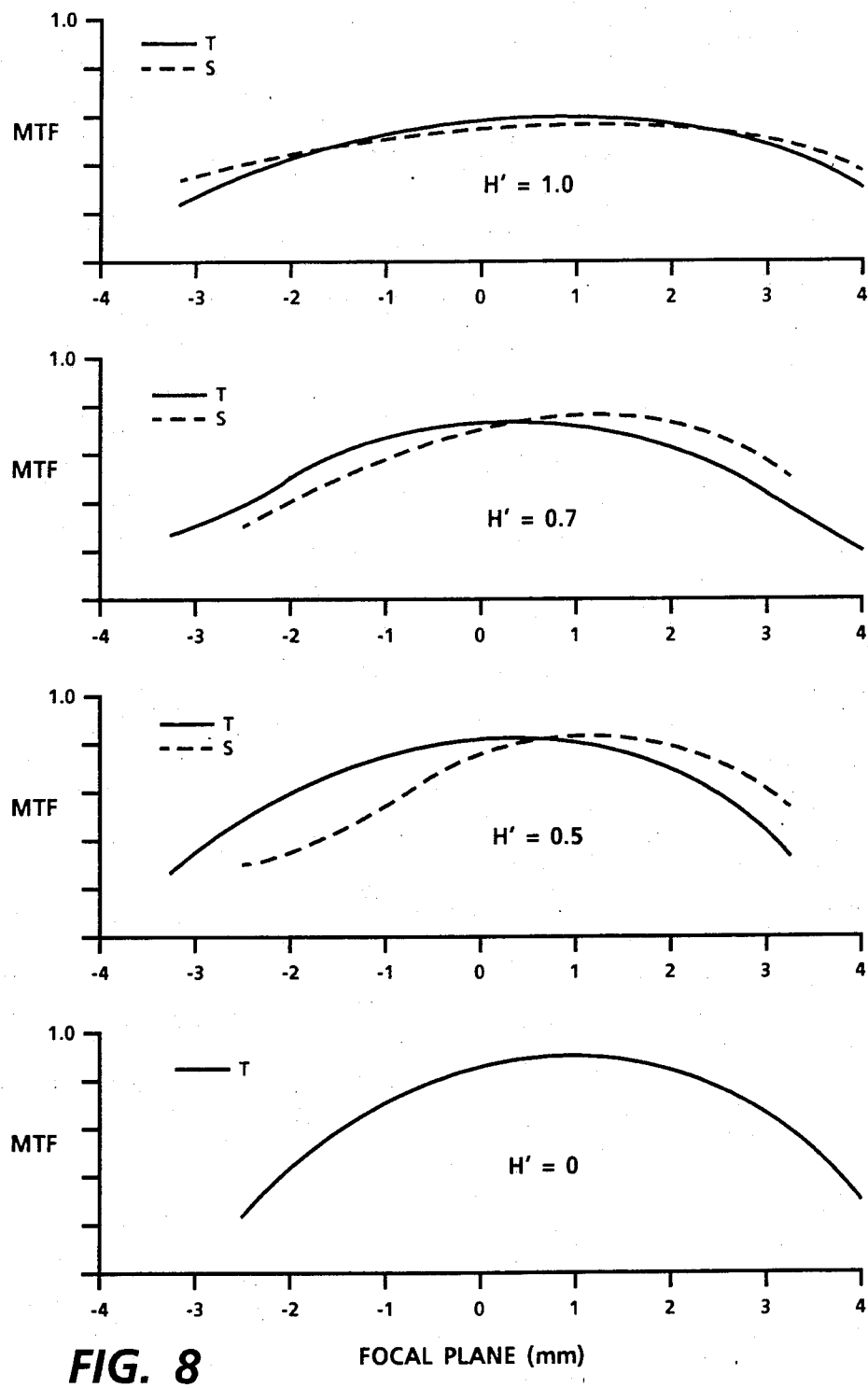

FIG. 8 shows the through focus MTF for 6 line pairs/mm spatial frequency.

DESCRIPTION OF THE INVENTION

Although the present invention has utility in a wide variety of applications, the following description is directed towards its use as the imaging lens in a variable magnification photocopier.

In a photocopying environment where variable magnification is desired, a magnification range of 0.645 to 1.55 is generally sufficient for most copying purposes. This magnification range necessitates a corresponding range of lens focal length change. Focal length and magnification in an optical system are related by the following equation.

$$TC = F(2 - m - 1/m) \text{(thin lens approximation)}$$

$TC$ = total conjugate = $l + l'$
$F$ = lens focal length
$l$ = object distance (OD) = $F(1 - 1/m)$
$l'$ = image distance (ID) = $F(1 - m)$
$m$ = paraxial magnification = $y'/y$ When the magnification is changed by altering $l$ and $l'$, a focal length change is required to maintain a constant TC. This focal length change is obtained by altering the distance between lens components. The abberrations, introduced thereby into the focused image; especially astigmatism, are compensated for by the lens design shown in FIG. 1 as described in further detail below.

Referring now to FIG. 1, a zoom lens generally indicated at 20, is located along optical axis 22. An object plane is designated as 24 and an image plane as 26. Zoom lens 20 comprises 10 elements arranged symmetrically about a central aperture space. The lens elements are shown in their 1× position.

TABLE I

WIDE ANGLE LENS SURFACE DATA

| SURFACE | RADIUS (mm) | THICKNESS (mm) | GLASS |
|---|---|---|---|
| 1 | 82.8800 | 8.014(A) | FD10 |
| 2 | 174.4465 | 2.500(B) | LaCL6 |
| 3 | 39.6745 | Zoom Space $Z_1$ | AIR |
| 4 | 66.4647 | 6.186(C) | NbFD10 |
| 5 | 164.0424 | 2.278 | AIR |
| 6 | 358.5615 | 13.898(D) | FD5 |
| 7 | 37.4018 | 16.905(E) | LaCL2 |
| 8 | Plano | Zoom space $Z_2$ | AIR |
| 9 | Aperature Stop | Zoom Space $Z_3$ | AIR |
| 10 | Plano | 16.905(F) | LaCL2 |
| 11 | −37.4018 | 13.898(G) | FD5 |
| 12 | −358.5615 | 2.278 | AIR |
| 13 | −164.0424 | 6.186(H) | NbFD10 |
| 14 | −66.4647 | Zoom Space $Z_4$ | AIR |
| 15 | −39.6745 | 2.500 (I) | LaCL6 |
| 16 | −174.4465 | 8.014(J) | FD10 |
| 17 | −82.8800 | | |

Referring now to Table 1, there is provided lens surface data for the lens embodiment shown in FIG. 1. The lens is designed for an object plane 24 to image plane 26 distance of 660.4 mm and is used at an aperture of f/10 to copy an A3(8½×11″) size document at the object plane at 1× magnification. The lens has a half field angle exceeding 41° at 1×. Zoom spaces of $Z_1$ and $Z_4$ are equal; $Z_2$ and $Z_3$ are also equal, and at 1× $Z_1$, $Z_4$=28.17 mm.

Figure 2:
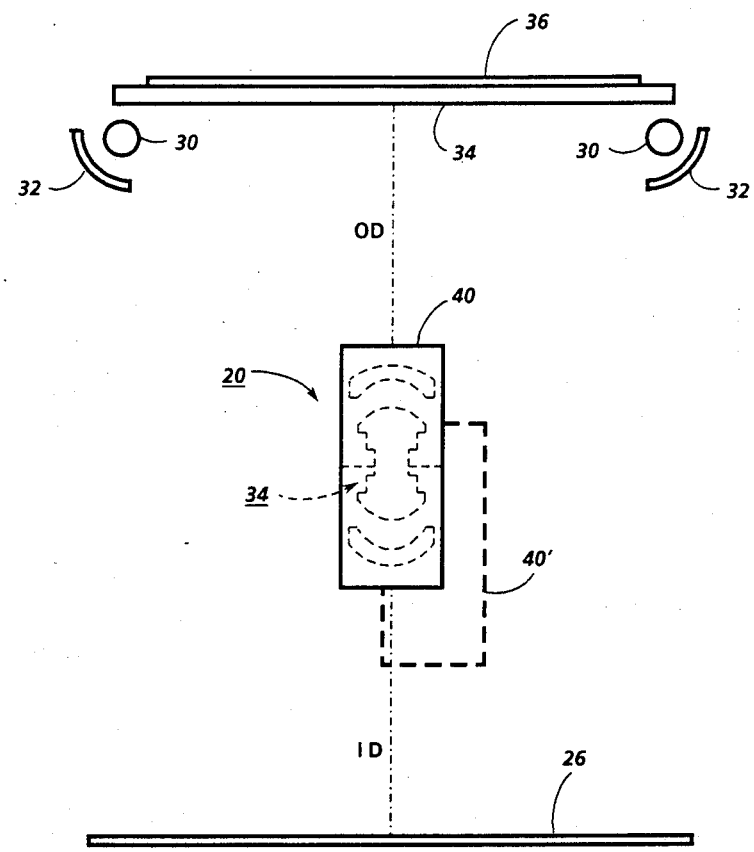
FIG. 2 is a schematic diagram of the lens of FIG. 1 in a multimagnification, imaging system.

FIG. 2 is a schematic representation of the use of zoom lens 20 in a full frame, variable magnification photocopier environment. Lamps 30 and reflectors 32 illuminate the underside of platen 34 upon which a document 36 to be reproduced is placed. Lens 20, at position 40 is at unity magnification position and projects an image of document 36 onto image plane 26 which may be, for example, a belt-type photoreceptor. Assuming that a magnification ratio of 0.653× is required, lens 20 is translated by means not shown, but which may include any conventional motor means, to dotted position 40 to change magnification in accordance with the relationship expressed in Equation 1.

Figure 3:
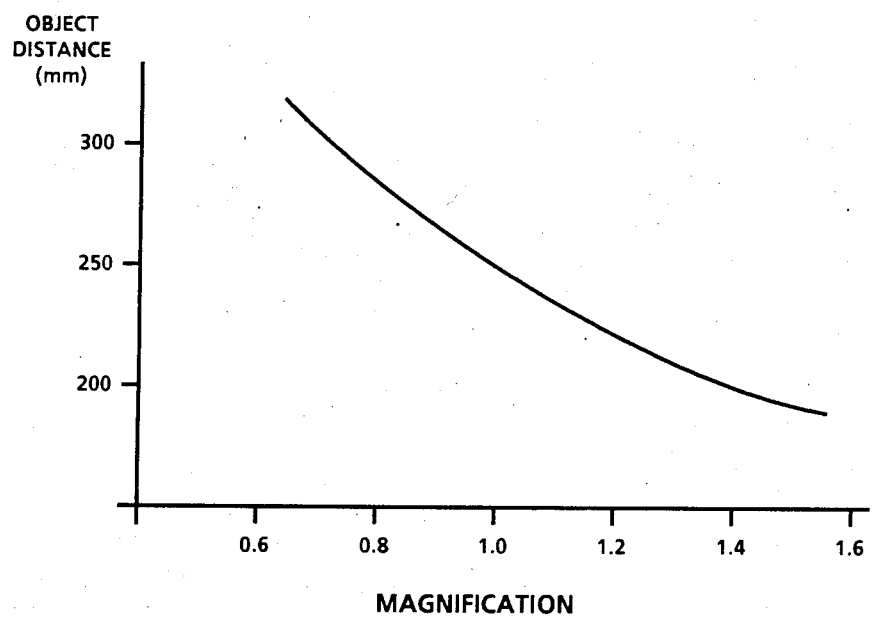
FIG. 3 shows a plot of object distance variation through magnification for the lens of FIG. 1.
Figure 4:
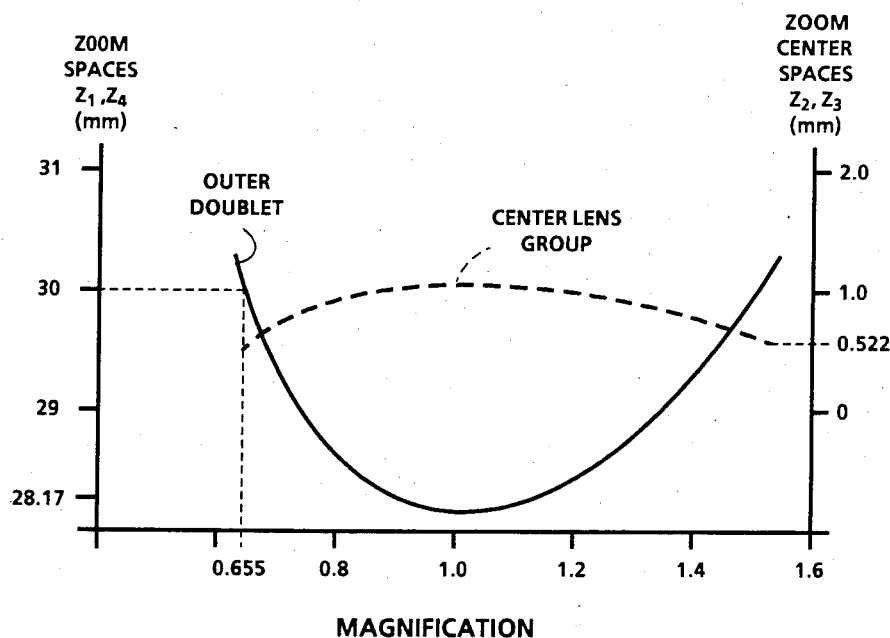
FIG. 4 shows a plot of inner lens air space values over magnification for the lens of FIG. 1.

Simultaneous with the movement of the entire lens, two additional lens element movements take place. Lens groups AB and IJ, which have negative refractive power are moved outward. Lens group CDE and FGH, which have positive refractional power, are moved inward toward the aperture stop. The net effect of these movements is to increase the $Z_1$, $Z_4$ zoom spaces, and to decrease the $Z_2$ $Z_3$ zoom spaces. The increase in the $Z_1$, $Z_4$ space provides for focal length adjustment while the decrease in spaces $Z_2$, $Z_3$ compensate for astigmatism and field curvature variation. FIG. 3 is a plot of object distance vs. magnification. Object distance is shown as "OD" in FIGS. 1 and 2. FIG. 4 is a plot of the zoom spaces $Z_1$, $Z_4$ (left ordinate solid line plot) and central aperture zoom spaces $Z_2$, $Z_3$ (right ordinate, dotted line) over magnification. As shown, the zoom spaces increase from the 28.17 mm value at 1× to a value of 30.014 at 0.653×: Central zoom spaces $Z_2$, $Z_3$ decrease from the value of 1.042 mm at 1× to 0.522 mm at 0.653×. Because of the lens symmetry, the same values are associated with lens movement to the inverse enlargement position of 1.523×.

FIGS. 5a and 5b show the effects of astigmatism at the 1.55× position for the lens 10 of the present invention (FIG. 5a) as compared to the same zoom lens lacking this central aperture adjustment (FIG. 5b). As shown, the field curvature measured along the abscissa in mm is plotted in both the saggital and tangential components over the relative field. It is evident that the astigmatism is much more pronounced in the FIG. 5b plot.

FIG. 6 shows the astigmatism curves for three values of magnification. The upper half of FIG. 7 shows distortion along the horizontal axis as a percent versus relative object height along the vertical axis for 0.653 magnification (upper left) and 1.523 magnification (upper right). The lower half of FIG. 7 shows lateral color along the horizontal axis in mm versus relative object height along the vertical axis. These graphs show the high state of correction obtained for these difficult aberrations in wide angle lenses.

FIG. 8 shows the MF at 1× magnification (vertical scale) versus plane shift for a spatial frequency of 6 line pairs/mm. Four field points are shown, H'=1.0 is full field, and H'=0 is on axis. Both tangential (solid curve) and sagittal (dashed curve) are plotted. These curves show the high state of astigmatism correction, giving excellent depth of focus.

A preferred range for the refractive power of the outer doubled lens group is between −0.9 and −1.1 of the overall zoom lens refractive power. A preferred range for the inner lens group is between 1.1 and 1.5 of the overall zoom lens refractive power.

The above additional motion of the lens group does have an effect on the focal length. However, the change is slight, from 145.792 to 145.559 for this embodiment, and the effects are negligible. Also, the effects of the adjustment on spherical, coma, Petzal, distortion, axial color and lateral color are all very small and do not significantly affect image quality.

While the invention has been described with reference to the structure disclosed, it is not confined to the details set forth, but is intended to cover such modifications or changes as may come within the scope of the following claims:

What is claimed is:

1. A wide angle zoom lens having a half field angle exceeding 35° movably located between an object and image plane comprising a plurality of lens elements arranged along an optical axis and on both sides of a central stop defining a central air space therebetween, said lens elements arranged into two moveable outer lens groups having negative refractive power and two moveable inner lens groups having positive refractive power, each inner lens group separated from the outer lens group by a first zoom space and from the aperture stop by a second zoom space, wherein, as said zoom lens changes its vertical location between said object and image planes, resulting in a magnification change, said inner and outer lens groups are moveable so as to change the first zoom spaces to adjust the lens focal length change and to change the second zoom space so as to compensate for astigmatism and field curvature variation, said zoom lens made substantially according to the following specification:

TABLE I

| WIDE ANGLE LENS SURFACE DATA | | | |
|---|---|---|---|
| SURFACE | RADIUS (mm) | THICKNESS (mm) | GLASS |
| 1 | 82.8800 | 8.014(A) | FD10 |
| 2 | 174.4465 | 2.500(B) | LaCL6 |
| 3 | 39.6745 | Zoom Space $Z_1$ | AIR |
| 4 | 66.4647 | 6.186(C) | NbFD10 |
| 5 | 164.0424 | 2.278 | AIR |
| 6 | 358.5615 | 13.898(D) | FD5 |
| 7 | 37.4018 | 16.905(E) | LaCL2 |
| 8 | Plano | Zoom space $Z_2$ | AIR |
| 9 | Aperature Stop | Zoom Space $Z_3$ | AIR |
| 10 | Plano | 16.905(F) | LaCL2 |
| 11 | −37.4018 | 13.898(G) | FD5 |
| 12 | −358.5615 | 2.278 | AIR |
| 13 | −164.0424 | 6.186(H) | NbFD10 |
| 14 | −66.4647 | Zoom Space $Z_4$ | AIR |
| 15 | −39.6745 | 2.500 (I) | LaCL6 |
| 16 | −174.4465 | 8.014(J) | FD10 |
| 17 | −82.8800 | | |
| | $Z_4 = Z_1$ AND | $Z_3 = Z_2$ | |

2. A wide angle zoom lens having a half field angle exceeding 35° movably located between an object and image plane comprising a plurality of lens elements arranged along an optical axis and on both sides of a central stop defining a central air space therebetween, said lens elements arranged into two moveable outer lens groups having negative refractive power and two moveable inner lens groups having positive refractory power, each inner lens group separated from the outer lens group by a first zoom space and from the aperture stop by a second zoom space, wherein, as said zoom lens changes its vertical location between said object and images planes, resulting in a magnification change, said inner and outer lens groups are moveable so as to change the first zoom spaces to adjust the lens focal length change and to change the second zoom space so as to compensate for astigmatism and field curvature variation, and wherein said outer lens groups each comprise a positive meniscus element concave toward the center, cemented to a negative meniscus element concave toward the center.

3. A wide angle zoom lens movably located between an object and image plane comprising a plurality of lens elements arranged along an optical axis and on both sides of a central stop defining a central air space therebetween, said lens elenents arranged into two moveable outer lens groups having negative refractive power and two moveable inner lens groups having positive refractory power, each inner lens group separated from the outer lens group by a first zoom space and from the aperture stop by a second zoom space, said outer lens groups each comprising a positive meniscus element concave toward the center, cemented to a negative meniscus element also concave toward the center, and said inner lens groups each comprising a positive meniscus element concave toward the center and a cemented doublet comprising a first negative meniscus element concave toward the center, cemented to a positive plano element.

* * * * *